(12) United States Patent
Bankoski et al.

(10) Patent No.: US 8,781,004 B1
(45) Date of Patent: Jul. 15, 2014

(54) SYSTEM AND METHOD FOR ENCODING VIDEO USING VARIABLE LOOP FILTER

(75) Inventors: James Bankoski, Wynantskill, NY (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/081,538

(22) Filed: Apr. 7, 2011

(51) Int. Cl.
*H04N 7/12* (2006.01)

(52) U.S. Cl.
USPC .................................................. 375/240.29

(58) Field of Classification Search
None
See application file for complete search history.

(56) References Cited

U.S. PATENT DOCUMENTS

| | | |
|---|---|---|
| 3,825,832 A | 7/1974 | Frei et al. |
| 4,710,810 A | 12/1987 | Koga |
| 4,719,642 A | 1/1988 | Lucas |
| 4,729,127 A | 3/1988 | Chan et al. |
| 4,736,446 A | 4/1988 | Reynolds et al. |
| 4,816,906 A | 3/1989 | Kummerfeldt et al. |
| 4,868,764 A | 9/1989 | Richards |
| 4,891,748 A | 1/1990 | Mann |
| 4,924,310 A | 5/1990 | von Brandt |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,148,269 A | 9/1992 | de Haan et al. |
| 5,164,819 A | 11/1992 | Music |
| 5,270,812 A | 12/1993 | Richards |
| 5,274,442 A | 12/1993 | Murakami et al. |
| 5,278,647 A | 1/1994 | Hingorani et al. |
| 5,313,306 A | 5/1994 | Kuban et al. |
| 5,337,086 A | 8/1994 | Fujinami |
| 5,341,440 A | 8/1994 | Earl et al. |
| 5,365,280 A | 11/1994 | De Haan et al. |
| 5,377,018 A | 12/1994 | Rafferty |
| 5,398,068 A | 3/1995 | Liu et al. |
| 5,432,870 A | 7/1995 | Schwartz |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Sath V Perungavoor
*Assistant Examiner* — Kate Luo
(74) *Attorney, Agent, or Firm* — Young Basile Hanlon & MacFarlane P.C.

(57) ABSTRACT

A system and method for encoding and decoding a video image having a plurality of frames is disclosed. The method includes a loop filter, which is used to reduce blocking artifacts in reconstructed frames. A quality value is determined for each block in the reconstructed frame and each associated predictor block. A variable incremental loop filter strength is calculated for each inter-predicted block using at least one of the quality values. The variable incremental loop filter strength is used during encoding by the loop filter to filter the reconstructed frame.

17 Claims, 8 Drawing Sheets

(56) References Cited

U.S. PATENT DOCUMENTS

| | | |
|---|---|---|
| 5,457,780 A | 10/1995 | Shaw et al. |
| 5,461,423 A | 10/1995 | Tsukagoshi |
| 5,488,570 A | 1/1996 | Agarwal |
| 5,512,952 A | 4/1996 | Iwamura |
| 5,561,477 A | 10/1996 | Polit |
| 5,568,200 A | 10/1996 | Pearlstein et al. |
| 5,576,767 A | 11/1996 | Lee et al. |
| 5,579,348 A | 11/1996 | Walker et al. |
| 5,623,308 A | 4/1997 | Civanlar et al. |
| 5,629,736 A | 5/1997 | Haskell et al. |
| 5,640,208 A | 6/1997 | Fujinami |
| 5,686,962 A | 11/1997 | Chung et al. |
| 5,689,306 A | 11/1997 | Jung |
| 5,706,059 A | 1/1998 | Ran et al. |
| 5,717,791 A | 2/1998 | Labaere et al. |
| 5,721,822 A | 2/1998 | Agarwal |
| 5,731,840 A | 3/1998 | Kikuchi et al. |
| 5,734,744 A | 3/1998 | Wittenstein et al. |
| 5,737,020 A | 4/1998 | Hall et al. |
| 5,748,242 A | 5/1998 | Podilchuk |
| 5,748,249 A | 5/1998 | Fujiwara |
| 5,767,909 A | 6/1998 | Jung |
| 5,774,593 A | 6/1998 | Zick et al. |
| 5,812,197 A | 9/1998 | Chan et al. |
| 5,818,536 A | 10/1998 | Morris et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,912,707 A | 6/1999 | Kim |
| 5,926,226 A | 7/1999 | Proctor et al. |
| 5,929,940 A | 7/1999 | Jeannin |
| 5,930,493 A | 7/1999 | Ottesen et al. |
| 5,946,414 A | 8/1999 | Cass et al. |
| 5,959,672 A | 9/1999 | Sasaki |
| 5,963,203 A | 10/1999 | Goldberg et al. |
| 5,985,526 A | 11/1999 | Tutt et al. |
| 5,987,866 A | 11/1999 | Weeger et al. |
| 5,991,447 A | 11/1999 | Eifrig et al. |
| 5,999,641 A | 12/1999 | Miller et al. |
| 6,005,980 A | 12/1999 | Eifrig et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,097,842 A | 8/2000 | Suzuki et al. |
| 6,100,940 A | 8/2000 | Dieterich |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,201,896 B1 | 3/2001 | Ishikawa |
| 6,212,234 B1 | 4/2001 | Andoh et al. |
| 6,233,279 B1 | 5/2001 | Boon |
| 6,240,135 B1 | 5/2001 | Kim |
| 6,272,179 B1 | 8/2001 | Kadono |
| 6,285,801 B1 | 9/2001 | Mancuso et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,389,072 B1 | 5/2002 | Tzou et al. |
| 6,400,763 B1 | 6/2002 | Wee |
| 6,414,995 B2 | 7/2002 | Okumura et al. |
| 6,418,166 B1 | 7/2002 | Wu et al. |
| 6,431,197 B2 | 8/2002 | Hintzman et al. |
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,529,638 B1 | 3/2003 | Westerman |
| 6,560,366 B1 | 5/2003 | Wilkins |
| 6,570,924 B1 | 5/2003 | Lynch et al. |
| 6,621,867 B1 | 9/2003 | Sazzad et al. |
| 6,661,842 B1 | 12/2003 | Abousleman |
| 6,687,303 B1 | 2/2004 | Ishihara |
| 6,697,061 B1 | 2/2004 | Wee et al. |
| 6,707,952 B1 | 3/2004 | Tan et al. |
| 6,735,249 B1 | 5/2004 | Karczewicz et al. |
| 6,765,964 B1 | 7/2004 | Conklin |
| 6,798,837 B1 | 9/2004 | Uenoyama et al. |
| 6,807,317 B2 | 10/2004 | Mathew et al. |
| 6,826,229 B2 | 11/2004 | Kawashima et al. |
| 6,904,096 B2 | 6/2005 | Kobayashi et al. |
| 6,907,079 B2 | 6/2005 | Gomila et al. |
| 6,934,419 B2 | 8/2005 | Zlotnick |
| 7,027,654 B1 | 4/2006 | Ameres et al. |
| 7,054,367 B2 | 5/2006 | Oguz et al. |
| 7,088,351 B2 | 8/2006 | Wang |
| 7,116,831 B2 | 10/2006 | Mukerjee et al. |
| 7,120,197 B2 * | 10/2006 | Lin et al. .................. 375/240.29 |
| 7,170,937 B2 | 1/2007 | Zhou |
| 7,194,036 B1 | 3/2007 | Melanson |
| 7,226,150 B2 | 6/2007 | Yoshimura et al. |
| 7,236,524 B2 | 6/2007 | Sun et al. |
| 7,260,148 B2 | 8/2007 | Sohm |
| 7,277,592 B1 | 10/2007 | Lin |
| 7,330,509 B2 | 2/2008 | Lu et al. |
| 7,358,881 B2 | 4/2008 | Melanson |
| 7,447,337 B2 | 11/2008 | Zhang et al. |
| 7,492,823 B2 | 2/2009 | Lee et al. |
| 7,499,492 B1 | 3/2009 | Ameres et al. |
| 7,590,179 B2 | 9/2009 | Mukerjee |
| 7,606,310 B1 | 10/2009 | Ameres et al. |
| 7,627,040 B2 | 12/2009 | Woods et al. |
| 7,657,098 B2 | 2/2010 | Lin et al. |
| 7,751,514 B2 | 7/2010 | Tsuie et al. |
| 7,916,783 B2 | 3/2011 | Gao et al. |
| 8,111,914 B2 | 2/2012 | Lee et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0064228 A1 | 5/2002 | Sethuraman et al. |
| 2002/0071485 A1 | 6/2002 | Caglar et al. |
| 2002/0141501 A1 | 10/2002 | Krishnamachari |
| 2002/0159524 A1 | 10/2002 | Gunter et al. |
| 2002/0168114 A1 | 11/2002 | Valente |
| 2002/0172431 A1 | 11/2002 | Atkins et al. |
| 2002/0176502 A1 | 11/2002 | Rose et al. |
| 2003/0023982 A1 | 1/2003 | Lee et al. |
| 2003/0039310 A1 | 2/2003 | Wu et al. |
| 2003/0053708 A1 | 3/2003 | Kryukov et al. |
| 2003/0053711 A1 | 3/2003 | Kim |
| 2003/0081850 A1 | 5/2003 | Karczewicz et al. |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis et al. |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013494 A1 | 1/2005 | Srinivasan et al. |
| 2005/0053294 A1 | 3/2005 | Mukerjee et al. |
| 2005/0117653 A1 | 6/2005 | Sankaran |
| 2005/0147165 A1 | 7/2005 | Yoo et al. |
| 2005/0169374 A1 | 8/2005 | Marpe et al. |
| 2005/0196063 A1 | 9/2005 | Guangxi et al. |
| 2005/0265447 A1 | 12/2005 | Park |

(56) References Cited

U.S. PATENT DOCUMENTS

| | | |
|---|---|---|
| 2005/0276323 A1 | 12/2005 | Martemyanov et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2007/0009044 A1 | 1/2007 | Tourapis et al. |
| 2007/0009171 A1 | 1/2007 | Nakashizuka et al. |
| 2007/0025448 A1 | 2/2007 | Cha et al. |
| 2007/0047648 A1 | 3/2007 | Tourapis et al. |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0140342 A1 | 6/2007 | Karczewicz et al. |
| 2007/0153899 A1 | 7/2007 | Koto et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0101469 A1 | 5/2008 | Ishtiaq et al. |
| 2008/0130755 A1 | 6/2008 | Loukas et al. |
| 2008/0159649 A1 | 7/2008 | Kempf et al. |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0279279 A1 | 11/2008 | Liu et al. |
| 2008/0298472 A1 | 12/2008 | Jain et al. |
| 2009/0034617 A1 | 2/2009 | Tanaka |
| 2009/0161770 A1 | 6/2009 | Dong et al. |
| 2009/0196351 A1 | 8/2009 | Cho et al. |
| 2009/0287493 A1 | 11/2009 | Janssen et al. |
| 2009/0316793 A1* | 12/2009 | Yang et al. ............... 375/240.24 |
| 2010/0022815 A1 | 1/2010 | Chikamatsu et al. |
| 2010/0034268 A1 | 2/2010 | Kusakabe et al. |
| 2011/0007799 A1 | 1/2011 | Karczewicz et al. |
| 2011/0229029 A1 | 9/2011 | Kass |
| 2012/0081580 A1 | 4/2012 | Cote et al. |

FOREIGN PATENT DOCUMENTS

| | | |
|---|---|---|
| EP | 1555832 | 7/2005 |
| EP | 1838108 | 9/2007 |
| EP | 1840875 | 10/2007 |
| JP | 61092073 | 5/1986 |
| JP | 2217088 | 8/1990 |
| JP | 2272970 | 11/1990 |
| JP | 8280032 | 10/1996 |
| JP | 09037246 | 7/1997 |
| JP | 09179987 | 7/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2005503737 | 2/2005 |
| JP | 2005308623 | 11/2005 |
| KR | 100213018 | 8/1999 |
| KR | 20010030916 | 4/2001 |
| WO | WO9904574 | 1/1999 |
| WO | WO0150770 | 7/2001 |
| WO | WO02089487 | 11/2002 |
| WO | WO03026315 | 3/2003 |
| WO | WO2006062377 | 6/2006 |
| WO | WO2006083614 | 8/2006 |
| WO | WO2007052303 | 5/2007 |
| WO | WO2008005124 | 1/2008 |
| WO | WO2012123855 | 9/2012 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

A High Efficient Method for Parallelizing Reconstructor & Loop Deblocking Filter on Multi-core Processor Platform, IP.com Prior art database, Feb. 12, 2008.

An Optimized In-Loop H264 De-Blocking Filter on Multi-Core Engines, IP.com Prior art database, Feb. 13, 2007.

Architectures for Efficient Partitioning of Video Coding Algorithms—H. 264 decoder, Nov. 7, 2006.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Ebrahimi, Touradj, et al.; "Joint motion estimation and segmentation for very low bitrate video coding", SPIE vol. 2501, 1995, 12 pp.

Guillotel, Philippe, et al.; "Comparison of motion vector coding techniques", SPIE vol. 2308, 1994, 11 pp.

International Telecommunications Union, ITU-T, Telecommunication Standardization Section of ITU, "Series H: Audiovisual and Mul-

(56) References Cited

OTHER PUBLICATIONS timedia Systems, Infrastructure of audiovisual services—Coding of moving video", Mar. 2010, 676 pp.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Lee, Yung-Lyul; Park, Hyun Wook; "Loop Filtering and Post-Filtering for Low-Bit-Rates Moving Picture Coding", Signal Processing: Image Communication 16 (2001) pp. 871-890.

Lihua Zhu, Guangfei Zhu, Charles Wang; Implementation of video deblocking filter on GPU Apr. 8, 2008.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Method for unloading YUV-filtered pixels from a deblocking filter for a video decoder, Oct. 11, 2006.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

ON2 Technologies Inc., White Paper TrueMotion VP7 Video Codec, Jan. 10, 2005, 13 pages, Document Version: 1.0, Clifton Park, New York.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Sikora, T. et al., Shape-adaptive DCT for generic coding of video, Circuits and Systems for Video Technology, IEEE Transactions on vol. 5, Issue 1, p. 59-62, Feb. 1, 1995.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.

Wenger et al.; RTP Payload Format for H.264 Video; The Internet Society; 2005.

Wiegand et al, "Overview of the H 264/AVC Video Coding Standard," IEEE Transactions on Circuits and Systems for Video Technology, vol. 13, No. 7, pp. 568, 569, Jul. 1, 2003.

Wiegand, Thomas, Study of Final Committee Draft of Joint Video Specification (ITU-T Rec. H.264 |ISO/IEC14496-10 AVC), Joint Video Team (JVT) of ISO/IEC MPEG & ITU-T VCEG (ISO/IEC JTC1/SC29/WG11 and ITU-TSG16 Q.6), JVT-F100, Dec. 5, 2002.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia-Electronic Technical Manual for ATE", IEEE 1996, 3 pp.

Wu, Yaowu; "InsideWebM Technology: The VP8 Alternate Reference Frame"; http://blog.webmproject.org/2010/05/inside-webm-technol ogy-vp8-a1lternate.html dated May 27, 2010.

Zhang, Kui, et al.; "Variable Block Size Video Coding With Motion Prediction and Motion Segmentation", SPIE vol. 2419, 1995, 9 pp.

Zhi Liu, Zhaoyang Zhang, Liquan Shen, Mosaic Generation in H.264 Compressed Domain, IEEE 2006.

Mohmoudi, Mona et al.; "Fast Image and video Denoising via Nonlocal Means of Similar Neighborhoods"; IEEE Signal Processing Letters vol. 12, No. 12, Dec. 2005.

\* cited by examiner

US 8,781,004 B1

SYSTEM AND METHOD FOR ENCODING VIDEO USING VARIABLE LOOP FILTER

TECHNICAL FIELD

The present invention relates in general to video encoding and decoding.

BACKGROUND

An increasing number of applications today make use of digital video signals for various purposes including, for example, business meetings between people in remote locations via video conferencing, high definition video entertainment, video advertisements, and sharing of user-generated videos. As technology is evolving, users have higher expectations for video quality and resolution even when video signals are transmitted over communications channels having limited bandwidth.

To realize transmission of higher quality video while limiting bandwidth consumption, a number of video compression schemes have been developed—including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10). These schemes may denote each image of a video as a frame, and subdivide each frame into groups of pixels called macroblocks or blocks.

These compression schemes may use prediction techniques to minimize the amount of data required to transmit video signals by using, for example, the spatial and temporal coherences in video information. Prediction techniques can allow for multiple past transmitted frames and future frames to be used as potential reference frame predictors for macroblocks in a frame. More recently, some predication techniques synthesize predictive reference frames that are not necessarily displayed during the decoding process, such as shown, for example, by U.S. Application Publication No. 2010/0061461, assigned to Google, Inc.

Many prediction techniques use block based prediction and quantized block transforms. The use of block based prediction and quantized block transforms can give rise to discontinuities along block boundaries during encoding. These discontinuities (commonly referred to as blocking artifacts) can be visually disturbing and can reduce the quality of the decoded video and the effectiveness of the reference frame used as a predictor for subsequent frames. These discontinuities can be reduced by the application of a loop filter.

A loop filter is typically applied to a reconstructed frame or a portion of a reconstructed frame at the end of the decoding process. A loop filter is typically used to reduce blocking artifacts. Once a reconstructed frame is processed by the loop filter, it may be used as a predictor for subsequent frames. Some conventional loop filters apply different filtering strengths to different block boundaries. For example, some compression systems vary the strength of the loop filter based on, for example, whether the block has been inter-coded or intra-coded. Other compression systems apply a filter strength from a set of discrete filter strengths based on, for example, motion vector strength and the type of reference frame predictor used, such as shown by U.S. Application Publication No. 2010/0061645.

SUMMARY

Systems and methods for encoding a video signal are disclosed. In accordance with one aspect of the disclosed embodiments, a method and apparatus is provided for encoding a video signal having at least one frame, each frame having at least one block. The method includes the steps of (1) identifying a current reconstructed block in a frame, the current reconstructed block having a current quality value, (2) identifying a predictor block that is associated with the current reconstructed block having a predictor quality value, (3) determining a loop filter strength for the current reconstructed block based at least on the current quality value and the predictor quality value, and (4) encoding using the loop filter strength In another aspect of the disclosed embodiments, a method is provided for decoding frames of compressed video information, each frame including a plurality of blocks. The method includes the steps of (1) reconstructing at least two of a plurality of blocks in a frame, each reconstructed block having a base loop filter strength and a quality value, (2) determining a predictor block used to reconstruct at least one of the plurality of reconstructed blocks, each predictor block having a quality value, (3) determining a variable incremental loop filter strength for each reconstructed block encoded using one of the determined predictor blocks based on the quality value of the reconstructed block and the quality value of the reconstructed block's associated predictor block, (4) determining a loop filter strength for at least one reconstructed block by using at least one of the reconstructed block's variable incremental loop filter strength and the reconstructed block's base loop filter strength, and (5) filtering the edge of at least one reconstructed block using the at least one reconstructed block's calculated loop filter strength.

In another aspect of the disclosed embodiments, an apparatus is provided for filtering blocking artifacts between adjacent blocks reconstructed from a frame of compressed video information. The apparatus includes a memory and a processor configured to (1) identify a current block stored in the memory having a current quality value, (2) identify a predictor block that is associated with the current block, the predictor block having a predictor quality value, (3) determine a loop filter strength for the current block based at least on the current quality value and the predictor quality value, and (4) filter the current block using the loop filter strength.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
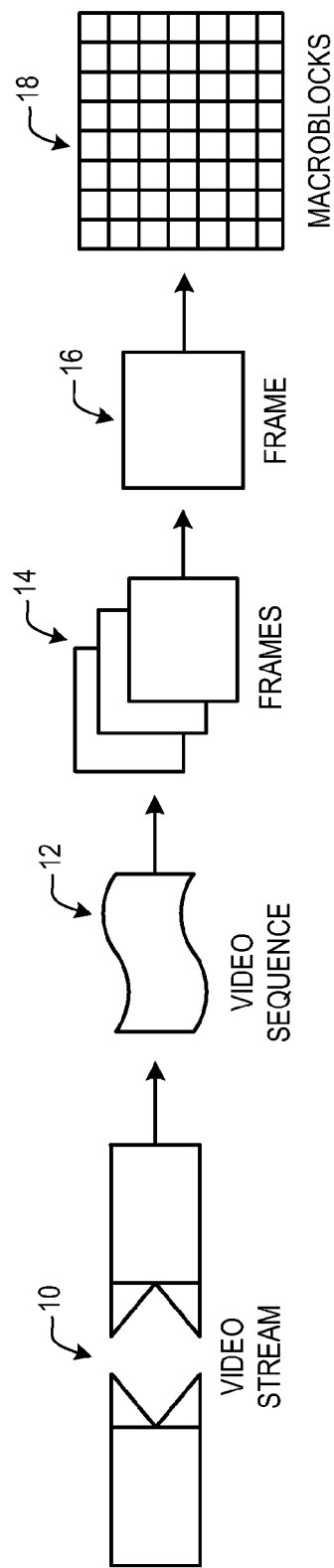
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a single frame 16. At the next level, frame 16 can be divided into a series of blocks or macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups.

Figure 2:
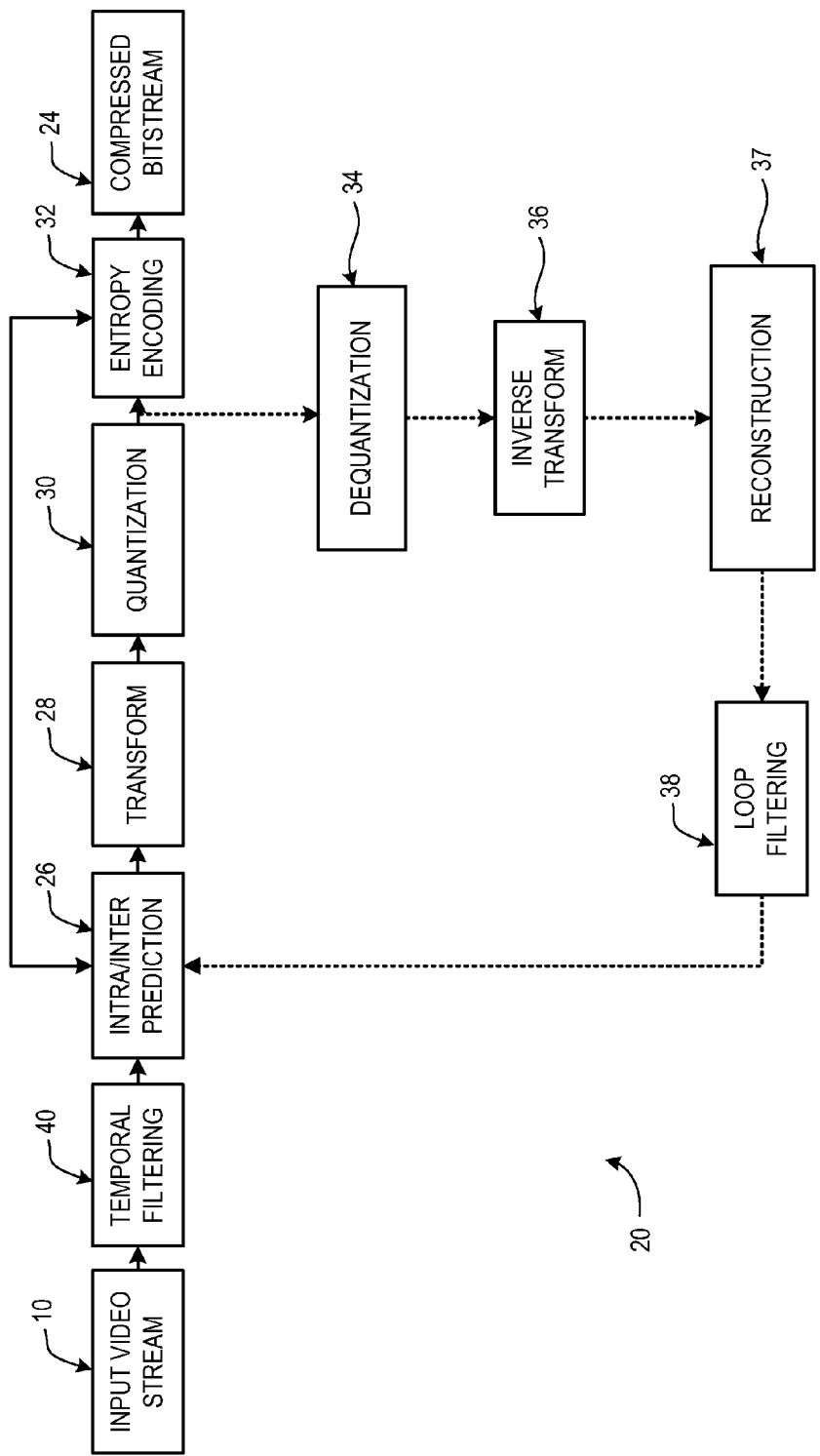
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or a compressed bitstream 24: a temporal filter stage 40, an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode input video stream 10.

Encoder 20 includes a temporal filter 40, which as shown in FIG. 2 can be included with the intra/inter prediction stage 26. Temporal filter 40 can be used to synthesize a reference or alternative predictor frame. The parameters of the temporal filter 40 can be adjusted to create a reduced-noise frame for use as a predictor during the encoding process. This adjustment process can permit the filtering to take into account contextual information (such as, for example, encoding modes) and other input to establish the degree of correlation between adjacent frames to filter noise from a common underlying signal. The process can be applied at the full-frame, macro-block or any other segmentation of the frame where the degree of spatial correlation between frames can be established.

When input video stream 10 is presented for encoding, each frame 16 within input video stream 10 is processed in units of macroblocks. At intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors, and quantizer value, are then output to compressed bitstream 24.

The reconstruction path in FIG. 2 is present to ensure that both encoder 20 and a decoder 42 (described below) use the same reference frames to decode compressed bitstream 24. The reconstruction path performs functions that are similar to functions that take place during the decoding process that are discussed in more detail below, including dequantizing the quantized transform coefficients at dequantization stage 34 and inverse transforming the dequantized transform coefficients at an inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts.

Other variations of encoder 20 can be used to encode compressed bitstream 24. For example, a non-transform based encoder can quantize the residual signal directly without transform stage 28. Or the temporal filter 40 might not be present. In another embodiment, an encoder may have quantization stage 30 and dequantization stage 34 combined into a single stage.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be final compressed bitstream 24.

Figure 3:
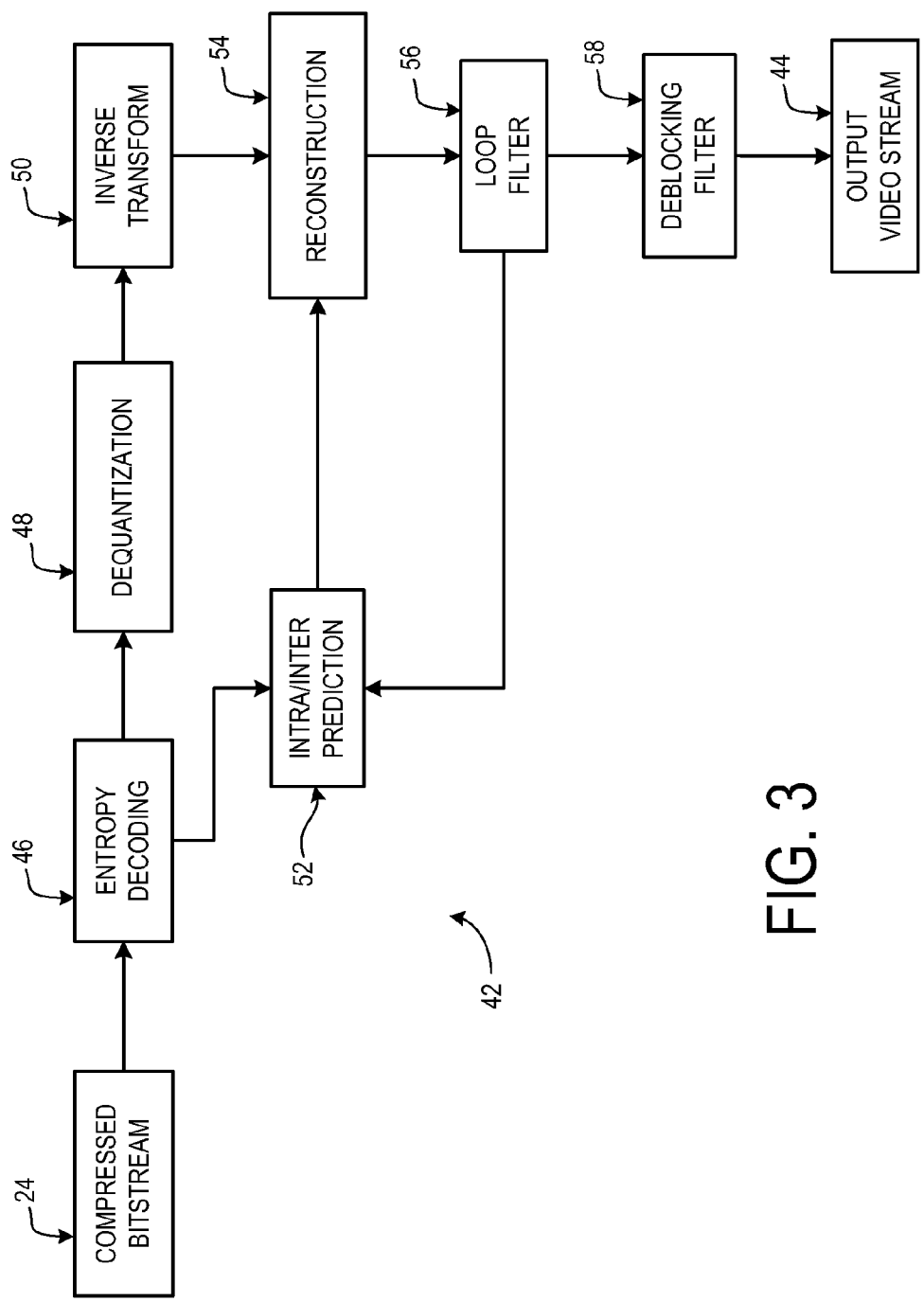
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, includes the following stages to perform various functions to produce an output video stream 44 from compressed bitstream 24: an entropy decoding stage 46, a dequantization stage 48, an inverse transform stage 50, an intra/inter prediction stage 52, a reconstruction stage 54, a loop filter stage 56 and a deblocking filtering stage 58. Other structural variations of decoder 42 can be used to decode compressed bitstream 24.

When compressed bitstream 24 is presented for decoding, the data elements within compressed bitstream 24 can be decoded by entropy decoding stage 46 (using, for example, Context Adaptive Binary Arithmetic Decoding) to produce a set of quantized transform coefficients. Dequantization stage 48 dequantizes the quantized transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Referring again to quantization stage 30, the process of quantization represents the range of transform coefficient values with a finite set of states, which as discussed previously, can be referred to as quantized transform coefficients or quantization levels. Some compression systems use, for example, a scalar quantization process, which can perform dividing operations on the transform coefficient values. The divisor used to perform the dividing operations affects the number of bits used to represent the image data as well as the quality of the resulting decoded image. Generally, when the divisor is set to a high value, the quantization process produces higher compression but also deteriorates the quality of the image. Conversely, setting the divisor to a low value results in improved image quality but less compression. During decoding, a corresponding dequantization process in. for example, dequantization stage 48, can perform multiplication operations using the same divisor value to convert the quantized transform coefficients to dequantized transform coefficients.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

To facilitate higher quality compressed video, it is helpful to have the best matching reference frame in order to have the smallest difference to encode, which generally results in a more compact encoding. Reference frames are based on past frames, future frames, or an intra-frame so that the encoder can find the best matching block to use in the predictive process as shown in, for example, U.S. Application Publication No. 2005/0286629. Reference frames can also be based on synthesized or constructed frames that are not shown to the end user after decoding, as shown in, for example, U.S. Application Publication no. 2010/0061461. Such constructed reference frames are referred to herein as "alternative reference frames." The alternative reference frames are constructed from macroblocks, which are referred to herein as "alternative reference blocks."

The method of constructing a reference frame can include selecting the target frame and using temporal filter 40 (FIG. 2) to remove video noise from several source frames centered on that target frame.

Figure 4:
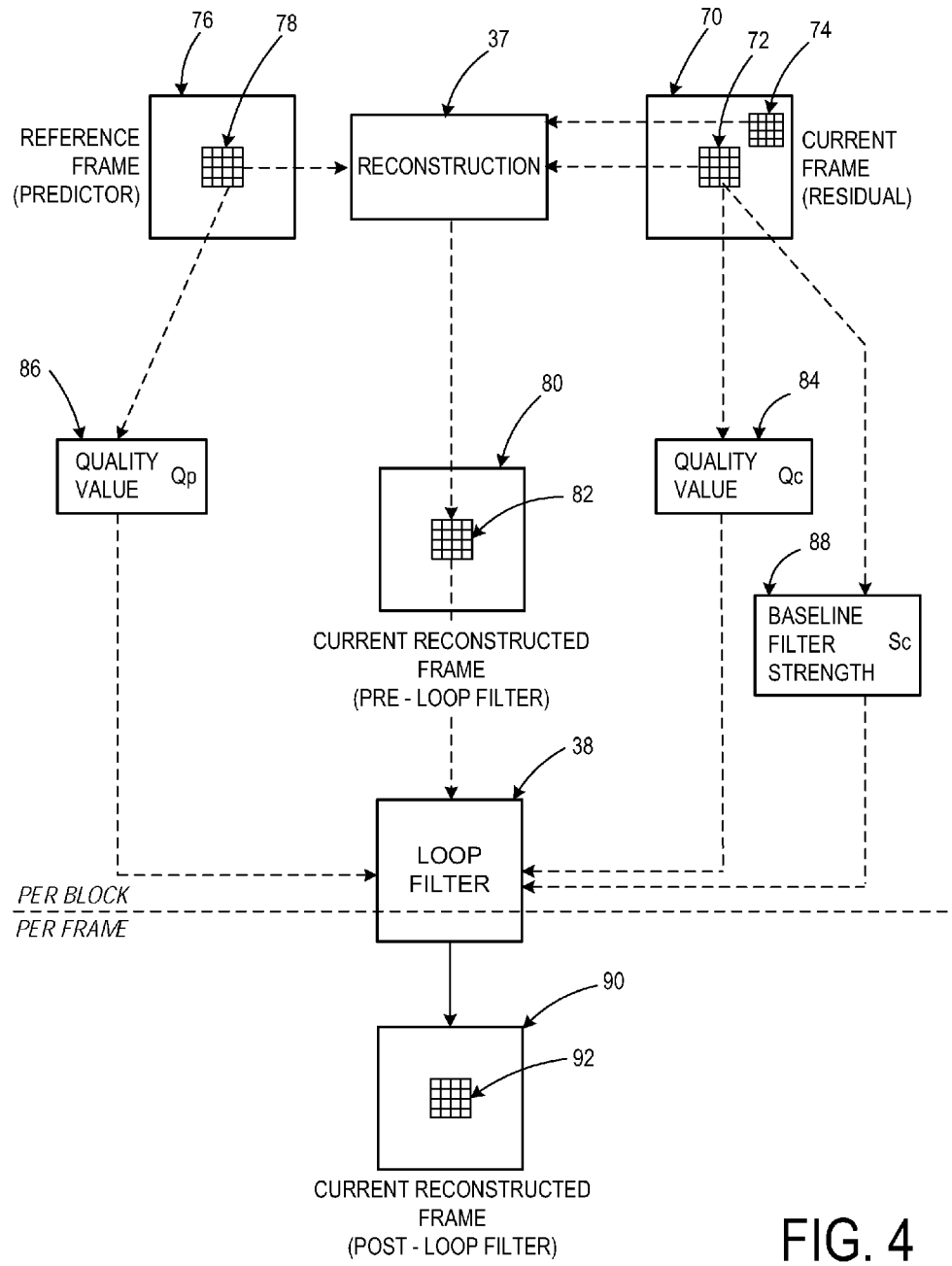
FIG. 4 is a schematic diagram illustrating the reconstruction and loop filter as shown in the encoder of FIG. 1.

FIG. 4, which is a schematic diagram illustrating the reconstruction 37 and loop filter 38 as shown in the encoder 20 of FIG. 1 is now described. First shown is a current frame 70 which is a derivative residual, such as is output by inverse transform 36 of the encoder. Included in current frame 70 is a current block 72. Current block 72 is encoded by, for example, inter-frame prediction or intra-frame prediction. If current block 72 is inter-frame predicted, it will refer to a reference block 78 that is included in a reference frame 76 as its predictor block. If current block 72 is intra-frame predicted, it will refer to a second block 74 in the current frame 70 as its predictor block.

Current block 72 and its predictor block (either second block 74 or predictor block 78) are then combined in reconstruction stage 37 of the encoder to produce a reconstructed block 82 in a reconstructed frame 80. Reconstructed block 82 and reconstructed frame 80 is then processed by loop filter 38 of the encoder 20.

Current block 72 has an associated current quality value (Qc) 84 and reference block 78 also has an associated predictor quality value (Qp) 86. Either quality value may be stored or obtained at a resolution of per frame, per group of blocks, or per block. Either quality value may refer to its block's quantization level, such as the divisor applied in quantization stage 30 as described earlier. Alternatively, the quality values may refer to any way of representing the degree of loss of data in a block in a lossy compression scheme. Other ways of representing quality include the bit rate of the compression, the difficulty of compression, or the actual loop filter strength used to previously encode and decode the predictor block.

Current block 72 also has an associated baseline filter strength (Sc) 88. The baseline filter strength (Sc) 88 indicates the strength of the loop filter for that block before any incremental adjustment. The baseline filter strength (Sc) 88 may be defined by either the current block 72 or the current frame 70. Alternatively, the baseline filter strength (Sc) 88 may be defined independently of the current block 72 or the current frame 70 by encoder 20.

This embodiment of loop filter 38 takes as input per reconstructed block 82, the current quality value (Qc) 84, the predictor quality value (Qp) 86, and the baseline filter strength (Sc) 88. The loop filter 38 calculates a loop filter strength for each block by modifying the baseline filter strength (Sc) 88 using at least the current quality value (Qc) 84 and the predictor quality value (Qp) 86.

Once loop filter 38 processes each reconstructed block 82 in reconstructed frame 80, the loop filter 38 filters the entire reconstructed frame 80 using the calculated loop filter strengths. The resulting output from loop filter 38 is a decoded frame 90, which includes a decoded block 92 that has been loop filtered using the loop filter strength calculated above. But in an alternative embodiment, it is possible for less than the entire reconstructed frame 80 to be filtered at a given time.

Figure 5:
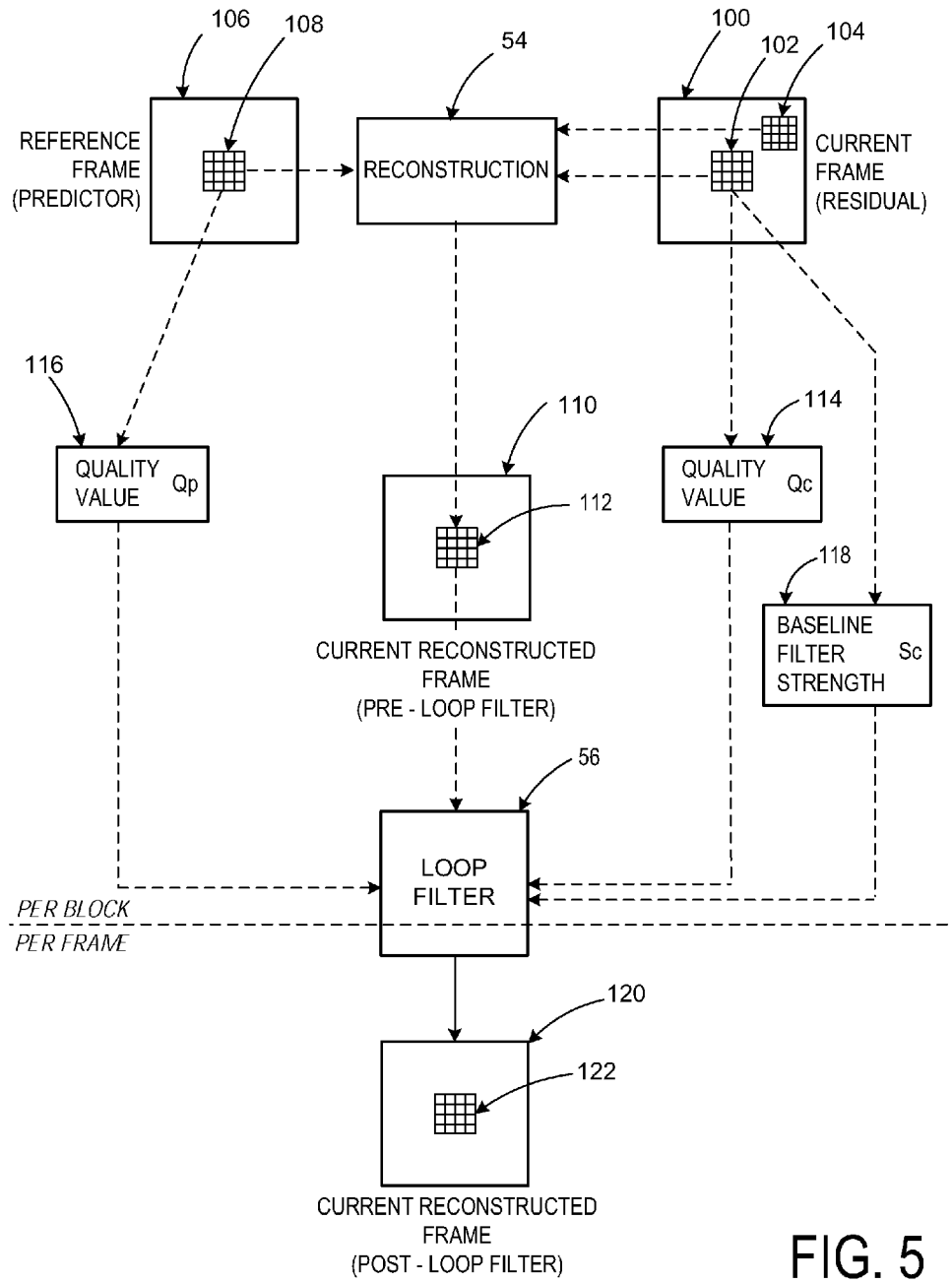
FIG. 5 is a schematic diagram illustrating the reconstruction and loop filter as shown in the decoder of FIG. 2.

FIG. 5, which is a schematic diagram illustrating the reconstruction 54 and loop filter 56 as shown in the decoder 42 of FIG. 2 is now described. In this embodiment, the reconstruction and loop filter as implemented in the decoder 42 is very similar to that of the encoder 20 as shown in FIG. 4. As explained previously, loop filter 38, as a part of the reconstruction path of encoder 20, produces similar output as loop filter 56.

First shown is a current frame 100 which is a derivative residual, such as is output by inverse transform 50 of the decoder. Included in current frame 100 is a current block 102. Current block 102 was encoded by, for example, inter-frame prediction or intra-frame prediction. If current block 102 is inter-frame predicted, it will refer to a reference block 108 that is included in a reference frame 106 as its predictor block. If current block 102 is intra-frame predicted, it will refer to a second block 104 in the current frame 100 as its predictor block.

Current block 102 and its predictor block (either second block 104 or predictor block 108) is then combined in reconstruction stage 54 of the decoder to produce a reconstructed block 112 in a reconstructed frame 110. Reconstructed block 112 and reconstructed frame 110 is then processed by loop filter 56 of the decoder 42.

Current block 102 has an associated current quality value (Qc) 114 and reference block 108 also has an associated predictor quality value (Qp) 116. Either quality value may refer to its block's quantization level, such as indicated by the multiplier applied in dequantization stage 48 of the decoder described earlier. Alternatively, the quality values may refer to any way of representing the degree of loss of data in a block in a lossy compression scheme. Other ways of representing quality include the bit rate of the compression, the difficulty of compression, or the base loop filter strength associated with the current block.

Current block 102 also has an associated baseline filter strength (Sc) 118. The baseline filter strength indicates the strength of the loop filter for that block before any incremental adjustment. The baseline filter strength may be defined by either the current block 102 or the current frame 100. Alternatively, the baseline filter strength may be defined independently of the current block 102 or the current frame 100 by decoder 42.

This embodiment of loop filter 56 takes as input per reconstructed block 112, the current quality value (Qc) 114, the predictor quality value (Qp) 116, and the baseline filter strength (Sc) 118. The loop filter 56 calculates the loop filter strength for each block by modifying the baseline filter strength (Sc) 118 using at least the current quality value (Qc) 114 and the predictor quality value (Qp) 116.

Once loop filter 56 processes each reconstructed block 112 in reconstructed frame 110, the loop filter 56 filters the entire reconstructed frame 110 using the calculated loop filter strengths. The resulting output from loop filter 56 is the decoded frame 120, which includes the decoded block 122 that has been loop filtered using the loop filter strength calculated above. But in an alternative embodiment, it is possible for less than the entire reconstructed frame 110 to be filtered at a given time.

An embodiment of a loop filter to calculate and apply variable loop filter strengths is now disclosed. The embodiment below is described with respect to loop filter 38 of the encoder, but it may also be implemented in an equivalent fashion with respect to loop filter 56 of the decoder.

Figure 6:
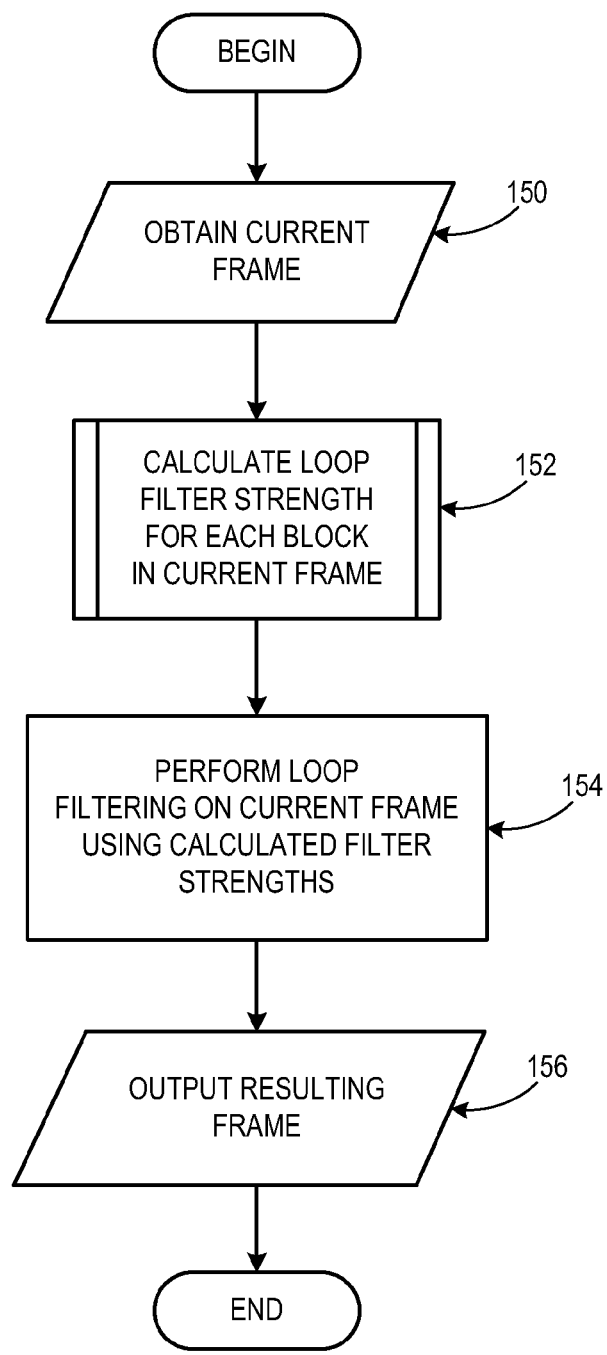
FIG. 6 is a flow chart of a method of calculating and applying variable loop filter strengths in the loop filters shown in FIGS. 2-5.

FIG. 6 is a flow chart of a method of calculating and applying variable loop filter strengths in the loop filters shown in FIGS. 2-5. The first step of the method is to obtain the current frame to be decoded, such as reconstructed frame 70 (150). Then, the loop filter strength is calculated for each block (such as reconstructed block 72) in the reconstructed frame (152). Alternatively, the loop filter strength could be calculated for some subset of blocks within the reconstructed frame. The process for calculating the loop filter strength for each block is described in more detail with respect to FIG. 7 later.

Once the loop filter strength for each block or subset of blocks is calculated, those blocks are loop filtered using the calculated loop filter strengths of step 152 (154). Once loop filtering is completed for the entire reconstructed frame, the resulting frame (such as decoded frame 90) is output and the method ends (156).

Figure 7:
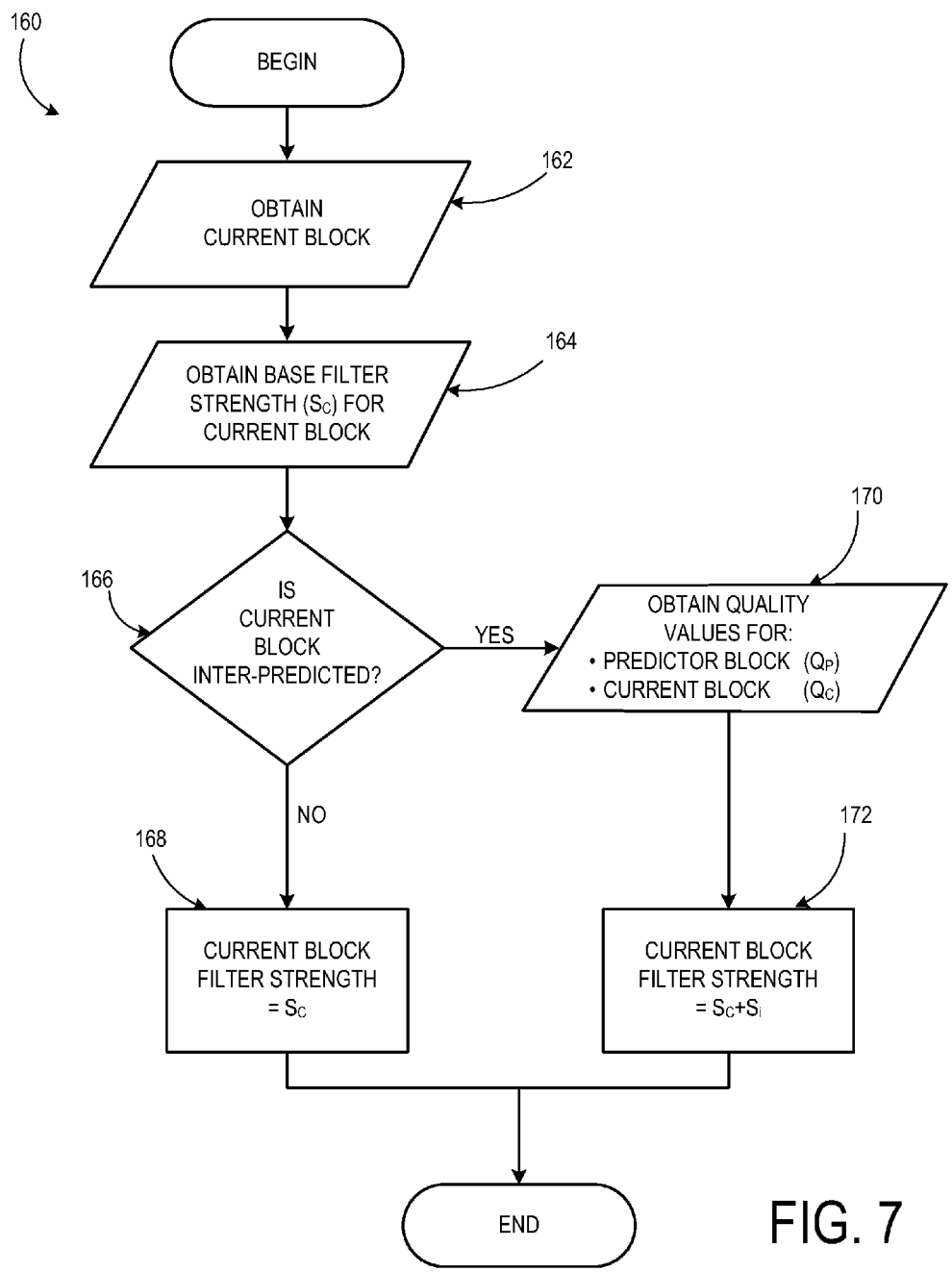
FIG. 7 is a flow chart of a method of calculating a variable loop filter strength of a block as referenced by FIG. 6.

FIG. 7 is a flow chart of a method 160 of calculating the loop filter strength of a block as referenced by FIG. 6. Method 160 obtains the block to be processed (such as reconstructed block 82) (162). Typically, the reconstructed block would be provided by the loop filter calculation step 152 of FIG. 6 to the method 160. Once the reconstructed block is identified, the base filter strength (Sc) (such as base filter strength (Sc) 88) will be obtained for the reconstructed block (164). As described above, base filter strength (Sc) may be associated with the block or frame. Alternately, base filter strength (Sc) may be determined by the encoder 20.

Then the loop filter 38 determines whether or not the reconstructed block was inter-predicted (166). If the reconstructed block was not inter-predicted, the filter strength of the reconstructed block will be set to Sc and the method will end for the block (168). However, if the block was inter-predicted, then quality values related to the reconstructed block will be obtained (170).

The obtained quality values include the quality of the associated current block (Qc) and the quality of the associated predictor block (Qp). These quality values are analogous to current quality value (Qc) 84 and predictor quality value (Qp) 86. As described earlier, these quality values may indicate quantizer strength or another metric of block quality. Alternatively, these quality values may be associated the entire frame or portion of frame associated with either block.

Once the quality values are obtained, the block's loop filter strength (S) is calculated using the following formula: S=Sc+Si (172). The variable incremental loop filter strength (Si) is calculated by referencing the quality values obtained above. An exemplary formula to calculate the variable incremental loop filter strength is: Si=f(Qp−Qc). In this exemplary formula, the relative quality difference between a block and its predictor is determined. Then, the relative quality is normalized by function f to produce an appropriate variable incremental loop filter strength value. Function f typically would involve multiplying the relative quality difference by a constant value to obtain an appropriate variable incremental loop filter strength. However, it may be necessary to apply a more complex normalization function, such as a table lookup or a piecewise function.

Alternatively, the variable incremental loop filter strength may be calculated by a function of Qp and Qc, for example: Si=f(Qp, Qc). This type of function would process the quality values using some complex function, and then would also normalize the output of that complex function to produce Si. Then, once S is calculated, the loop filter strength of the reconstructed block will be set to S and the method will end for the block.

The above-described embodiments of encoding or decoding may illustrate some exemplary encoding techniques. However, in general, encoding and decoding as those terms are used in the claims are understood to mean compression, decompression, transformation or any other change to data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

Figure 8:
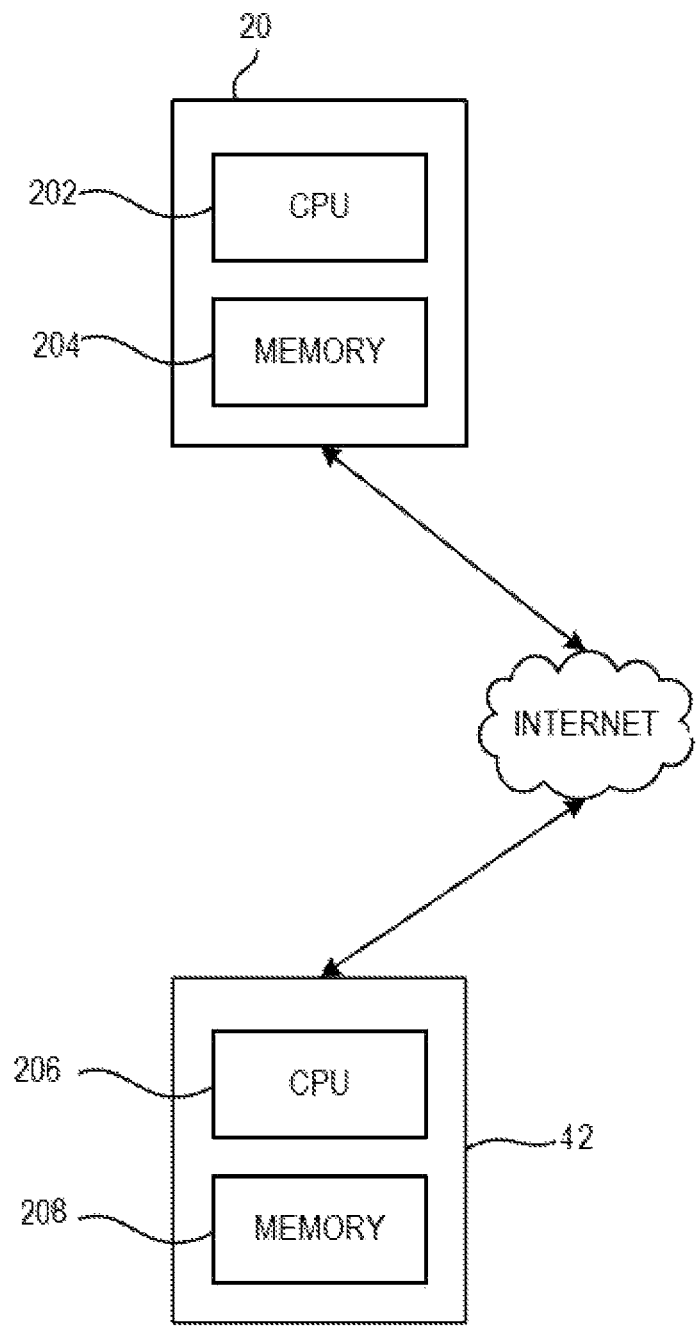
FIG. 8 is a block diagram of computer systems implementing the video compression system and video decompression system described herein.

For example, encoder 20 can be implemented using a general purpose processor with a computer program that, when executed, carries out any of the respective methods, algorithms and/or instructions described herein. FIG. 8 illustrates one suitable implementation in which encoder 20 is implemented in a general purpose computer including a central processing unit (CPU) 202 and random access memory (RAM) 204. Decoder 42 is implemented using a general purpose computer including a central processing unit (CPU) 206 and random access memory (RAM) 208. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example, as shown in FIG. 8. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal, the method comprising:
    identifying, by a processor, a current quality value of a current block of a residual frame;
    identifying a predictor quality value associated with a predictor block that is associated with the current block;
    determining a baseline filter strength associated with the current block;
    generating a reconstructed block based on the current block and the predictor block;
    determining a loop filter strength for the reconstructed block, wherein the current block is an inter-predicted block, and wherein determining the loop filter strength includes modifying the baseline loop filter strength using a variable incremental loop filter strength based at least on the current quality value and the predictor quality value;
    filtering the reconstructed block using the loop filter strength; and
    using the filtered reconstructed block as a predictor block.

2. The method of claim 1, wherein determining the loop filter strength for the reconstructed block based at least on the current quality value and the predictor quality value includes:
    determining a quality value difference between the current quality value and the predictor quality value.

3. The method of claim 2, wherein determining the loop filter strength for the reconstructed block based at least on the current quality value and the predictor quality value includes:
    determining a normalized loop filter strength based on the quality value difference.

4. The method of claim 1, wherein the current quality value is at least one of a quantization level, a base loop filter strength, a bit rate, or a difficulty metric of the current block.

5. The method of claim 1, wherein the predictor quality value is at least one of a quantization level, a loop filter strength, a bit rate, or a difficulty metric associated with the predictor block.

6. The method of claim 1, further comprising:
    identifying a second current quality value of a second current block of the residual frame;
    identifying a second predictor quality value associated with a second predictor block that is associated with the second current block;
    generating a second reconstructed block based on the second current block and the second predictor block;
    determining a second loop filter strength for the second reconstructed block based at least on the second current quality value and the second predictor quality value; and
    filtering the second reconstructed block using the second loop filter strength.

7. The method of claim 1, wherein a current quality value of another block from the residual frame differs from the current quality value of the current block.

8. The method of claim 1, wherein the predictor block is one of a plurality blocks from a reference frame other than the residual frame.

9. A method for decoding compressed video information, the method comprising:
   generating a reconstructed block based on a block of a residual frame and a predictor block associated with the block of the residual frame, the reconstructed block associated with a base loop filter strength, the block of the residual frame associated with a first quality value, and the predictor block associated with a second quality value;
   identifying a variable incremental loop filter strength for the reconstructed block based on the first quality value and the second quality value;
   identifying a loop filter strength for the reconstructed block modifying the base loop filter strength using the variable incremental loop filter strength; and
   filtering the reconstructed block using the loop filter strength; and
   using the filtered reconstructed block as a predictor block.

10. The method of claim 9, wherein the first quality value is at least one of a quantization level, a base loop filter strength, a bit rate, or a difficulty metric of the block of the residual frame.

11. The method of claim 9, wherein the second quality value is at least one of a quantization level, a loop filter strength, a bit rate, or a difficulty metric associated with the predictor block.

12. The method of claim 9, wherein identifying the loop filter strength includes:
   determining a quality value difference between the first quality value and second quality value.

13. The method of claim 12, wherein determining the loop filter strength includes:
   determining a normalized loop filter strength based on the quality value difference.

14. An apparatus for filtering blocking artifacts between adjacent blocks reconstructed from a frame of compressed video information, the apparatus comprising:
   a memory; and
   a processor configured to execute instructions stored in the memory to:
      identify a current quality value of a current block of a residual frame,
      identify a predictor quality value associated with a predictor block that is associated with the current block,
      determine a baseline filter strength associated with the current block,
      generating a reconstructed block based on the current block and the predictor block,
      determine a loop filter strength for the reconstructed block, wherein the current block is an inter-predicted block, and wherein determining the loop filter strength includes modifying the baseline loop filter strength using a variable incremental loop filter strength based at least on the current quality value and the predictor quality value, and
      filter the reconstructed block using the loop filter strength, and
      use the filtered reconstructed block as a predictor block.

15. The apparatus of claim 14, wherein the processor is configured to determine the loop filter strength for the reconstructed block based on a quality value difference between the current quality value and the predictor quality value.

16. The apparatus of claim 15, wherein current quality value is at least one of a quantization level, a base loop filter strength, a bit rate, or a difficulty metric of the current block and the predictor quality value is at least one of a quantization level, a loop filter strength, a bit rate, or a difficulty metric associated with the predictor block.

17. The apparatus of claim 14, wherein the processor is configured to use the filtered reconstructed block as a predictor block.

* * * * *

UNITED STATES PATENT AND TRADEMARK OFFICE
CERTIFICATE OF CORRECTION

PATENT NO. : 8,781,004 B1
APPLICATION NO. : 13/081538
DATED : July 15, 2014
INVENTOR(S) : James Bankoski et al.

It is certified that error appears in the above-identified patent and that said Letters Patent is hereby corrected as shown below:

Title Page 3, Column 2, Line 67, "Procesing" should be "Processing"

In the Claims

Column 11, Claim 9, Line 18, delete the word "and"

Column 12, Claim 14, Line 21, delete the word "and"

Signed and Sealed this
Seventh Day of October, 2014

Michelle K. Lee
*Deputy Director of the United States Patent and Trademark Office*